US007596553B2

(12) United States Patent     (10) Patent No.: US 7,596,553 B2
Meirovitz et al.     (45) Date of Patent: Sep. 29, 2009

(54) STRING MATCHING USING DATA BIT MASKS

(75) Inventors: Orna Meirovitz, Holon (IL); Dan Beiser, Raanana (IL)

(73) Assignee: Avaya Inc., Basking Ridge, NJ (US)

( * ) Notice: Subject to any disclaimer, the term of this patent is extended or adjusted under 35 U.S.C. 154(b) by 1220 days.

(21) Appl. No.: 10/269,742

(22) Filed: Oct. 11, 2002

(65) Prior Publication Data

US 2004/0073550 A1     Apr. 15, 2004

(51) Int. Cl.
    *G06F 7/00*     (2006.01)
(52) U.S. Cl. .............................. 707/4; 707/6; 709/217; 704/7
(58) Field of Classification Search ............. 707/3, 707/4, 6, 7, 10, 8, 2, 5; 709/215, 216, 217, 709/218
See application file for complete search history.

(56) References Cited

U.S. PATENT DOCUMENTS

| | | | |
|---|---|---|---|
| 5,051,947 A * | 9/1991 | Messenger et al. ............. | 707/3 |
| 5,497,488 A | 3/1996 | Akizawa et al. | |
| 6,169,969 B1 | 1/2001 | Cohen | |
| 6,269,189 B1 | 7/2001 | Chanod | |
| 6,311,183 B1 | 10/2001 | Cohen | |
| 2003/0125931 A1* | 7/2003 | Campbell ..................... | 704/10 |
| 2004/0073550 A1* | 4/2004 | Meirovitz et al. ............. | 707/6 |

FOREIGN PATENT DOCUMENTS

| EP | 0233401 A2 * | 11/1986 |
|---|---|---|
| EP | 1156430 A2 * | 11/2001 |
| WO | WO 02/42863 | * 11/2000 |

OTHER PUBLICATIONS

Baeza-Yates et al., A New Approach to Text Searching, Communications of the ACM, Oct. 1992, vol. 35, No. 10, pp. 74-82.*
Wu et al., Fast Text Searching Allowing Errors, Communications of the ACM, Oct. 1992, vol. 35, No. 10, pp. 83-91.*
Baeza-Yates et al., A New Approach to Text Searching Preliminary Version, ACM, pp. 168-175.*
Baeza-Yates et al., Fast Text Searching for Regular Expressions or Automaton Searchig on Tires, Journal of the ACM, vol. 43, No. 6, Nov. 1996, pp. 915-936.*
Kukich, Techniques for Automatically Correcting Words in Text, ACM Computing Surveys, vol. 24, No. 4, Dec. 1992.*

* cited by examiner

*Primary Examiner*—Shahid A Alam
*Assistant Examiner*—Joshua Bullock
(74) *Attorney, Agent, or Firm*—Muncy, Geissler, Olds & Lowe, PLLC

(57) ABSTRACT

A method of searching a text for a pattern. The method includes receiving at least one portion of the text, providing a pattern to be searched for in the text and generating, in accordance with the pattern, a plurality of bit masks each representing one or more characters, each bit mask indicating for each position in the received portion whether the position carries one of the one or more characters represented by the bit mask. Bit-wise operations indicative of whether the pattern is found in the portion are performed on the generated bit masks and an indication of whether the pattern appears in the text is provided responsive to the performed bit-wise operations.

35 Claims, 9 Drawing Sheets

STRING MATCHING USING DATA BIT MASKS

FIELD OF THE INVENTION

The present invention relates to string matching and in particular to searching for a plurality of patterns on-line.

BACKGROUND OF THE INVENTION

In many applications it is necessary to find patterns within a text. Exemplary applications requiring searching patterns in a text include text mining, DNA sequence searching and monitoring data packets passing over a network. Many methods have been suggested for searching patterns in a text in order to achieve as fast a search as possible.

In pattern searching, a text is searched for a pattern formed of a sequence of characters. Each character of the text and the pattern may have any value from an alphabet of the text.

U.S. Pat. Nos. 6,169,969 and 6,311,183 to Cohen, the disclosures of which documents are incorporated herein by reference, describe methods of finding patterns in which the search for the pattern is performed in a plurality of stages, beginning for example with a hash function. Other search methods, are described in U.S. Pat. No. 6,269,189 to Chanod and U.S. Pat. No. 5,497,488 to Akizama, et al., the disclosures of which are incorporated herein by reference.

In a method known as "shift-And", a bit-mask table is generated for the searched pattern. The table includes, for each character of the alphabet, a bit-mask which has '1's in positions in which the character appears in the pattern. During the search process, for each character of the text, the bit-mask of the character is manipulated using logical bit operations.

The article "Fast and Flexible String Matching by Combining Bit-parallelism and Suffix Automata" by G. Navarro and M. Raffinot, the disclosure of which is incorporated herein by reference, describes a "bit parallelism on suffix automata" method which is a variation of the "shift-And" method. This method progresses over the text in jumps over segments allowing, on the average, a relatively fast operation. For some patterns, however, such as "ababababc" or "aaaaaaaab" the method may need to continuously retract in order to systematically find all the appearances of the pattern in the text.

An improvement of this method for a plurality of patterns is performed by concatenating a plurality of patterns to be searched in the string. This improvement, however, is limited in the number of patterns that can be searched for concurrently.

SUMMARY OF THE INVENTION

An aspect of some embodiments of the present invention relates to a method of searching for one or more patterns in a text, in which bit-masks are generated for segments of the text. For each text segment, a set of bit masks are generated, optionally including a bit mask for each character in any of the patterns searched for in the text. The bit mask of a character indicates the existence of the character in each position of the text segment.

In some embodiments of the invention, a search machine includes a plurality of matching units, each of which searches the text for a different pattern. Optionally, all the matching units search in parallel through the same text segment. Each matching unit uses bit masks corresponding to all of the characters in its pattern, in each segment, in determining whether a match with its pattern is found in the text. Optionally, the matching units are implemented in dedicated hardware, for example by FPGAs and/or ASICs.

Using bit masks of the text (unlike using bit masks of the pattern, as in a prior art method), allows finding all occurrences of a pattern, including partially overlapping occurrences, without requiring backing up in the text or propagation at a rate lower than the length of the segments. The search through the text can thus be performed at a constant rate which is independent of the contents of the text and independent of the pattern. Operation at a constant rate allows parallel operation of a plurality of matching units searching for different patterns, with a single input line, without requiring the stalling of the input line for slower units due to different pattern analysis rates.

In some embodiments of the invention, in each matching unit, the bit masks prepared for the characters of a searched pattern are shifted according to the positions of the characters in the pattern. Optionally, the shifting results in having the bit masks of the characters of the pattern aligned relative to each other, such that the bits corresponding to consecutive characters of the pattern are located (logically) beneath each other. An AND operation is optionally performed on the shifted bit masks so as to generate a result word. A '1' bit in the result word is indicative of a match. In some embodiments of the invention, the AND operation is additionally performed on a feedback word indicative of prefix matches from a previous segment. This feedback word is used to find matches spanning between two text segments.

In some embodiments of the invention, the text segments are of a predetermined length L, and the searched patterns are of a length of up to L. Optionally, patterns of a length greater than L are split into a plurality of sub-patterns of length up to L and their results are combined.

In some embodiments of the invention, each of the matching units includes a plurality of operation units (e.g., a shift unit, an AND unit and a result unit) which operate in parallel on different text windows, in accordance with a pipelining scheme.

Optionally, bit masks may be generated for groups of optional characters, when a search pattern allows for a match if any of the characters in the group is found in the text. The bit mask of a group of characters indicates the existence of one of the characters of the group in each position of the text segment.

There is therefore provided in accordance with an embodiment of the invention, a method of searching a text for a pattern, comprising receiving at least one portion of the text, providing a pattern to be searched for in the text, generating, in accordance with the pattern, a plurality of bit masks each representing one or more characters, each bit mask indicating for each position in the received portion whether the position carries one of the one or more characters represented by the bit mask, performing bit-wise operations indicative of whether the pattern is found in the portion, on the generated bit masks, and providing an indication of whether the pattern appears in the text, responsive to the performed bit-wise operations.

Optionally, receiving the at least one portion comprises receiving a plurality of consecutive portions of the text. Optionally, the plurality of portions have a same length. Optionally, at any time only a single text portion is processed. Optionally, after beginning to handle a text portion, previous text portions are not handled. Optionally, generating the plurality of bit masks comprises generating bit masks for each of the possible characters in the text and selecting bit masks corresponding to characters in the pattern.

Alternatively or additionally, generating the plurality of bit masks comprises generating bit masks for each of the characters or groups in the pattern. Optionally, generating the plurality of bit masks comprises generating bit masks in which each bit corresponds to a single position in the text portion. Optionally, generating the plurality of bit masks comprises generating bit masks such that each position in the text portion corresponds to a plurality of bits in the bit mask. Optionally, performing the bit-wise operations comprises shifting at least one of the bit masks according to the position of its respective one or more characters in the pattern.

Optionally, generating the plurality of bit masks comprises generating a number of bit masks equal to the number of characters in the text portion. Optionally, if the pattern includes fewer characters than in the text portion, one or more don't-care bit masks are generated.

Optionally, performing the bit-wise operations comprises performing an AND operation on the bit masks. Optionally, the AND operation is performed additionally on one or more bit words representative of the content of a previous portion of the text. Optionally, the one or more bit words comprise a feedback bit word indicative of appearance of prefixes of the pattern in the previous text portion.

Possibly, the one or more bit words comprise a carry over bit word indicative of appearance of another pattern included in a single multi-pattern with the pattern for which the bit words are generated, in the previous text portion. Optionally, providing the indication of whether the pattern appears in the text comprises providing an indication on where the pattern appears in the text. Optionally, performing bit-wise operations comprises performing a set of independents which is independent of the pattern and text. Optionally the method includes generating bit-masks, performing bit-wise operations and providing an indication for a plurality of patterns, substantially concurrently.

There is therefore provided in accordance with an embodiment of the invention, a search machine, comprising a text window adapted to receive a portion of a text, at least one bit mask generator adapted to generate a plurality of bit masks each representing one or more characters, each bit mask indicating for each position in the text window whether the position carries one of the one or more characters represented by the bit mask, and at least one pattern matching unit adapted to search for a respective pattern in the text, by manipulating bit masks, generated by the at least one bit mask generator, corresponding to the pattern.

Optionally, the text window is adapted to receive consecutive segments of a length L of the text. Optionally, the at least one pattern matching unit comprises a plurality of pattern matching units.

Optionally, the at least one bit mask generator comprises a single bit mask generator which provides bit masks to each of the plurality of pattern matching units. Alternatively, the at least one bit mask generator comprises a plurality of bit mask generators which correspond to the plurality of pattern matching units. Optionally, the search machine includes at least one transfer line which passes results from one pattern matching unit to at least one other pattern matching unit. Possibly, the at least one transfer line comprises at least two transfer lines which pass results from one pattern matching unit to at least one other pattern matching unit.

Optionally, the search machine includes a configurable controlled gate adapted to determine whether the transfer line passes results to the other pattern matching unit. Optionally, the plurality of pattern matching units are substantially identical. Optionally, at least one of the plurality of pattern matching units is different in structure from at least one other of the pattern matching units. Optionally, the plurality of pattern matching units comprise at least ten pattern matching units. Optionally, the plurality of pattern matching units represent patterns of at least two different lengths. Optionally, the at least one pattern matching unit comprises a shift unit adapted to shift at least one of the bit masks according to the position in the pattern represented by the bit mask. Optionally, the at least one pattern matching unit comprises an AND unit which performs an AND operation between bit masks corresponding to each of the positions of the pattern.

BRIEF DESCRIPTION OF FIGURES

Particular exemplary embodiments of the invention will be described with reference to the following description of embodiments in conjunction with the figures, wherein identical structures, elements or parts which appear in more than one figure are preferably labeled with a sa me or similar number in all the figures in which they appear, in which.

DETAILED DESCRIPTION OF EMBODIMENTS

Figure 1:
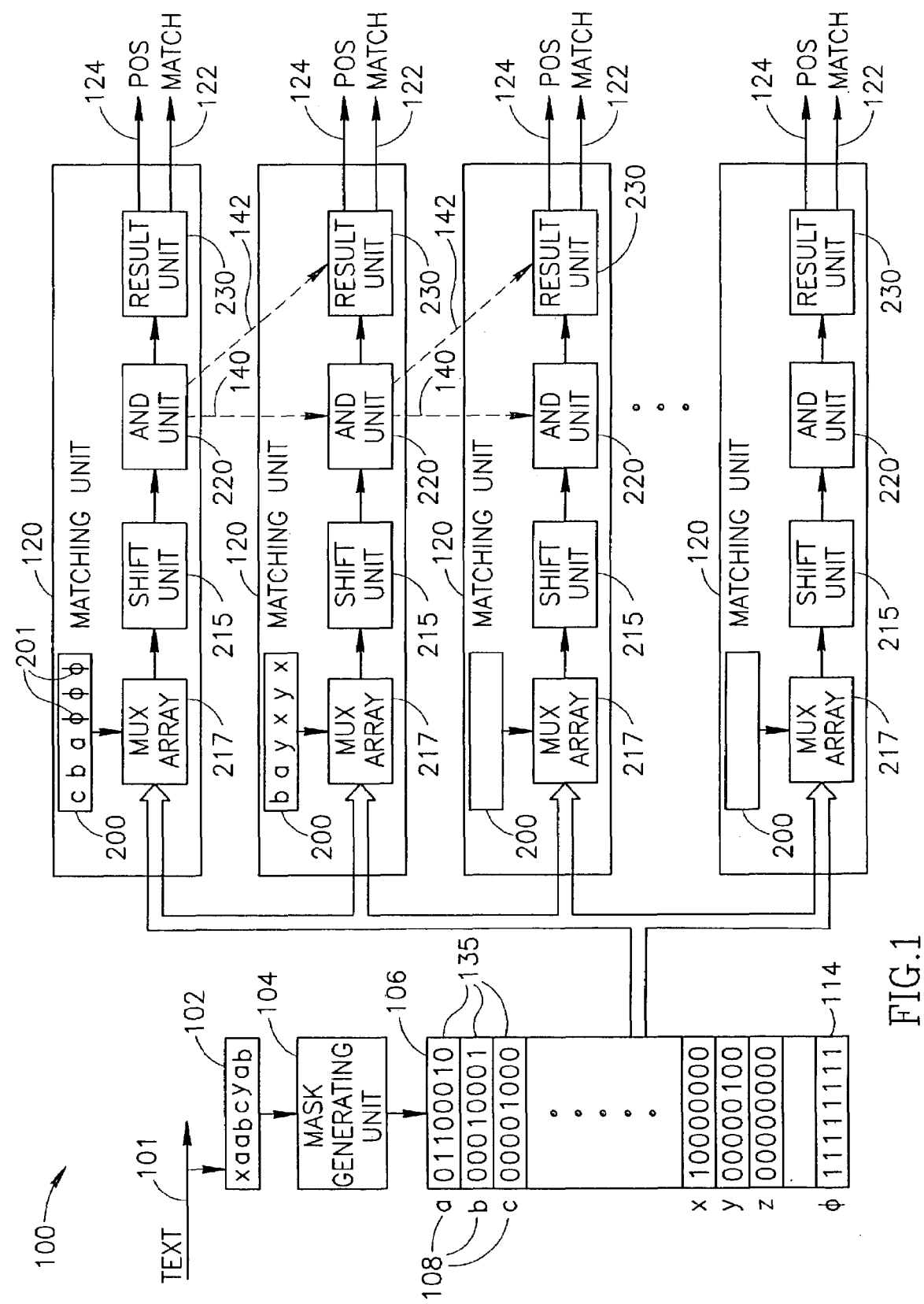
FIG. 1 is a schematic block diagram of a pattern searching machine, in accordance with an exemplary embodiment of the present invention.

FIG. 1 is a schematic block diagram of a pattern searching machine 100, in accordance with an embodiment of the present invention. Searching machine 100 is optionally used in online searching through a text received on an input line 101. Pattern searching machine 100 optionally comprises a text window register 102, which stores a current window of a length of L characters (e.g., L character of 8 bits each) of the text being searched. In some embodiments of the invention, periodically, at a rate of text reception on input line 101, window register 102 is filled with consecutive portions of the text. Each of a plurality of matching units 120 searches the contents of window register 102 for a respective pattern, optionally stored in a pattern register 200 of the matching unit. As described below, matching units 120 are adapted to find their patterns also in text portions spanning over two consecutive windows of the text.

In some embodiments of the invention, each of matching units 120 operates independent from other matching units, only using common bit masks, relating to the same contents of register 102. Alternatively, as described below in the discussion of transfer lines 140 and 142, neighboring matching units 120 may cooperate in searching for patterns longer than L. In the following description, until the discussion of transfer lines 140 and 142, each of matching units 120 is assumed to operate independently and lines 140 and 142 are ignored.

In some embodiments of the invention, searching machine 100 comprises a mask generating unit 104 which generates, for the contents of register 102, an alphabet match array 106. In some embodiments of the invention, for each character 108 in an alphabet of searching machine 100, alphabet match array 106 includes a bit mask 135 of length L. The bit mask 135 of a character 108 optionally has a '1' value in each position in which the character appears in register 102, while the remaining positions of the bit mask are '0'. Alternatively to generating bit masks 135 for the entire alphabet, bit masks are generated only for characters required by one or more of the patterns currently searched for by machine 100.

In some embodiments of the invention, bit masks 135 are also generated for groups of characters. A position is considered to match the group, and hence the bit mask includes a '1' for the position, if the position includes one of the characters of the group. Optionally, groups are defined by allowing one or more bits of the character (e.g., its ASCII representation) to have a don't care value. For example, upper and lower case letters may be included together in respective case insensitive letter groups (i.e., 'A' and 'a', 'B' and 'b', etc.). Alternatively or additionally, groups may be defined for any group of characters regardless of their bit representation, for example, groups may be defined for any letter and/or any digit. In some embodiments of the invention, the bit masks of these groups are generated by generating temporary bit masks for each of the characters in the group and performing a logical OR operation on the temporary bit masks. Optionally, the generation is performed in two clock cycles, one for generation of the temporary bit masks and the other for performing the OR operation. The use of two clock cycles prevents the additional OR operation from lengthening the duration of the time cycle of machine 100. Alternatively, the generation is performed in a single clock cycle in order to limit the number of clock cycles required from input to output.

Array 106 may include a predetermined number of spaces for group bit masks. Optionally, the groups for which bitmasks are generated, are predetermined. Alternatively, in loading patterns to be handled by machine 100, the groups for which bit masks are generated may be adjusted according to the needs of the patterns.

Each of matching units 120 optionally retrieves from alphabet match array 106, for example through a multiplexer (MUX) array 217 including multiplexers 212 (FIG. 2), only the bit masks corresponding to the characters in the pattern for which it searches. In some embodiments of the invention, each matching unit 120 comprises a shifting unit 215, an AND unit 220 and a result unit 230, the details of which are described below, in connection with FIG. 2. Optionally, each matching unit 120 (e.g., the result unit 230 thereof) has a match indication output line 122, which states whether a match was found and/or a position output line 124 which states the positions in the input text of the matches found.

In some embodiments of the invention, any number of matching units 120 may be included in machine 100 substantially without changes to the structure of machine 100. The number of matching units 120 is optionally selected according to the maximal number of patterns for which it may be desired to search the text concurrently, the expected lengths of these patterns and/or the desired search rate.

Optionally, searching machine 100 operates in accordance with a pipeline scheme. In some embodiments of the invention, in each operation cycle of searching machine 100, a first segment of the text is handled by result units 230, a second segment of the text is handled by AND units 220, a third segment of the text is handled by multiplexers 217 and shifting units 215, and a fourth text segment is handled by generating unit 104. Alternatively or additionally, any other pipeline scheme may be used according to the processing capabilities of the units, the timing requirements and/or chip space limitations of search machine 100. Further alternatively or additionally, for example, if machine 100 achieves a required search rate without pipelining and/or in order to conserve chip space, a pipeline scheme is not used.

In FIG. 1, text register 102 is shown as including the string "xaabcyab". In this example, the bit mask 135 of the letter "a" is "01100010", the bit mask 135 of the letter "b" is "00010001" and so on, as shown in FIG. 1. Note that for characters not currently in text register 102, all the bits in the bit map are zero, since the characters are not present in the pattern. In some embodiments of the invention, array 106 also stores a don't care bit mask 114, e.g., a sequence of '1' bits, which corresponds to don't care symbols 201, as described below.

Figure 2:
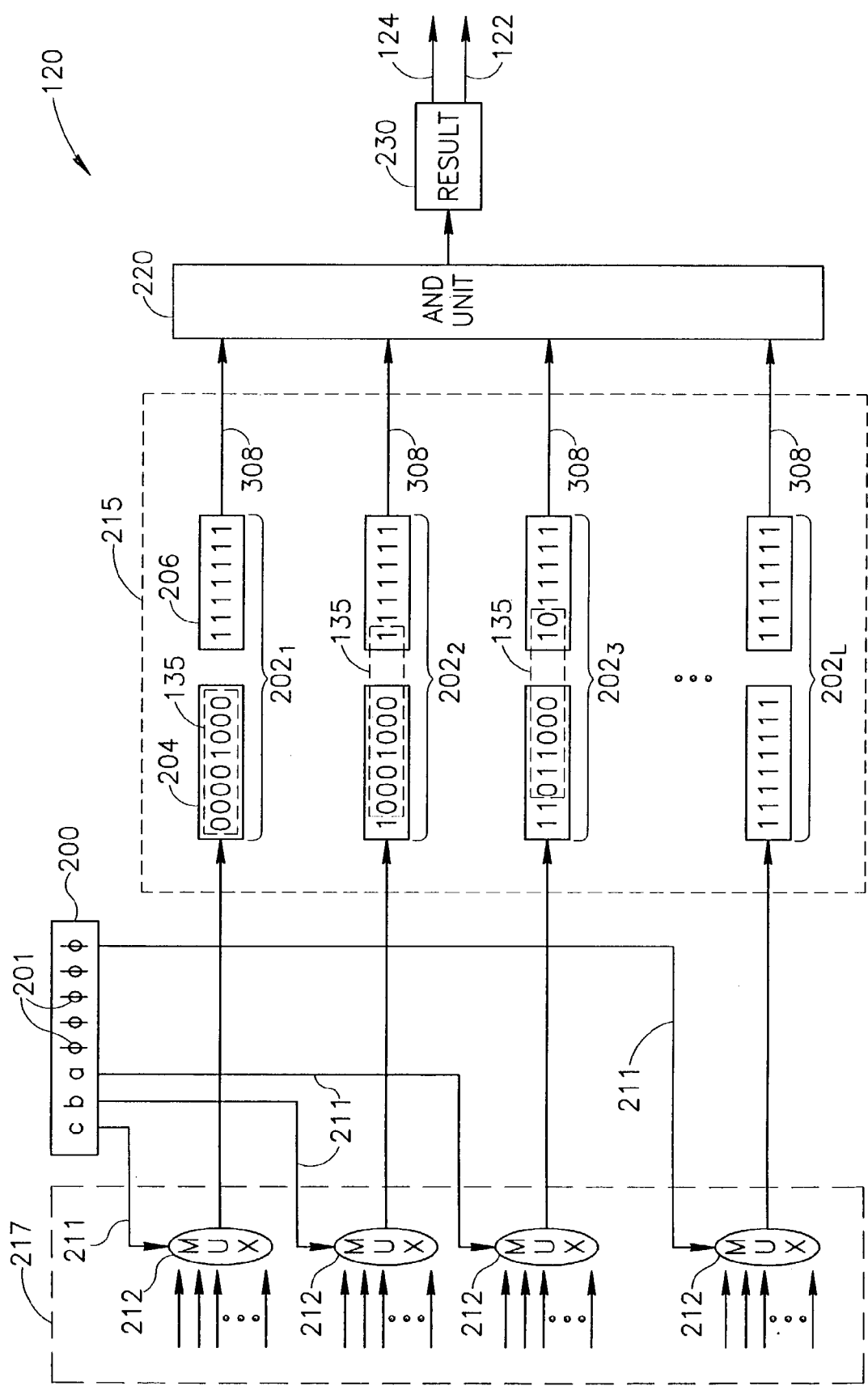
FIG. 2 is a schematic block diagram of a pattern matching unit, in accordance with an exemplary embodiment of the present invention.

FIG. 2 is a schematic block diagram of pattern matching unit 120, in accordance with an exemplary embodiment of the present invention. Matching unit 120 optionally comprises a pattern register 200, which stores a pattern handled by the matching unit. Pattern register 200 optionally has L positions, which are used to store a pattern of a length (k) of up to L characters. Optionally, when pattern register 200 stores a pattern shorter than L characters (k<L), the unused positions are filled with a don't care symbol 201 or are otherwise marked as unused. In some embodiments of the invention, including that shown, patterns are loaded into pattern register 200 in reverse order, and are aligned to the left. For example, in these embodiments, the string "abc" is stored in pattern register 200 as "cba". Alternatively, patterns may be loaded into pattern register 200 in their non-reversed order, in which case shift unit 215 is adjusted accordingly. Optionally, in these alternative embodiments, the patterns are filled into register 200 aligned to the right, such that the shift amount of each bus 202 (described below) is independent of the length of the pattern. Using predetermined shift amounts allows performing the shift by permanent wire routing, which is much faster and simpler than using a shift register.

Shift unit 215 of matching unit 120 optionally comprises an array of L buses 202 (marked $202_1$, $202_2$, etc.), each bus 202 corresponding to a character position in pattern register 200. Each bus 202 is optionally associated with a respective multiplexer 212 through which the bus receives one of the bit masks 135 from array 106 (FIG. 1). The selection control 211 of each multiplexer 212 is optionally received from the position of pattern register 200 corresponding to the bus 202 associated with the multiplexer. Optionally, when pattern register 200 stores a pattern shorter than L characters, the buses 202 corresponding to positions in pattern register 200 carrying the don't care symbol 201 are filled with the don't care bit mask 114.

Each bus 202 optionally includes 2L-1 bits; L bits belonging to a left bank 204 and L-1 bits belonging to a right bank 206. In some embodiments of the invention, each bit mask 135 is routed into its respective bus 202 with a right shift of a number of bits depending on the position in pattern register 200, to which the bus 202 corresponds.

In some embodiments of the invention, the shift amounts corresponding to the positions in pattern register 200 are from left to right from 0 to L-1. For example, bus $202_1$ corresponding to the 'c' shown in the left of pattern register 200 is shifted zero places, bus $202_2$ corresponding to the 'b' shown in the second from left position of pattern register 200 is shifted one place and bus $202_3$ corresponding to the 'a' shown in the third from left position of pattern register 200 is shifted two places. The remaining positions of buses 202 to which values were not loaded, are optionally filled with '1' bits.

As mentioned above, each bus 202 corresponds to a character of the pattern. The bit contents of each bus 202 state for each position in text window 102 whether it includes the character corresponding to the register. The shift operations described above, bring the bits corresponding to consecutive positions in the text window 102 to the same logical positions within buses 202. A column in left bank 204 including '1's in all of buses 202, generally corresponds to an occurrence of the pattern of matching unit 120 in text window 102.

In the example shown in FIG. 2, pattern matching unit 120 searches for the pattern "abc", which is stored in pattern register 200 as "cba". Bus $202_1$ includes the bit mask 135 of the character 'c', bus $202_2$ includes the bit mask 135 of the character 'b' and bus $202_3$ includes the bit mask 135 of the character 'c'. The remaining buses 202 are filled with don't care bit mask 114.

The contents of buses 202 are optionally passed onto respective registers (shown in FIG. 3A) in AND unit 220. As described below, AND unit 220 performs an AND operation on the columns of the shifted registers and generates a result bit mask indicating for each position of text window 102, whether a match of the pattern in pattern register 200 ends in the position. The result bit mask is optionally provided to result unit 230 which generates the output on lines 122 and 124.

Alternatively to performing the shift in the wiring of buses 202, buses 202 are replaced by shift registers which perform the shift using methods known in the art. Optionally, the bit masks 135 are loaded to the left bank 204 of the respective shift register, while the right bank 206 is filled with '1' bits, which are neutral in logical AND operations. The contents of the shift registers are then optionally shifted to the right according to their predetermined shift amounts. During the shift, the left bit positions vacated by the shift are optionally filled with '1's.

In some embodiments of the invention, the shift is performed on all of the shift registers regardless of their contents. Alternatively, the shift is not performed on registers carrying don't care bit mask 114 as the shift does not affect the contents of the register.

Figure 3A:
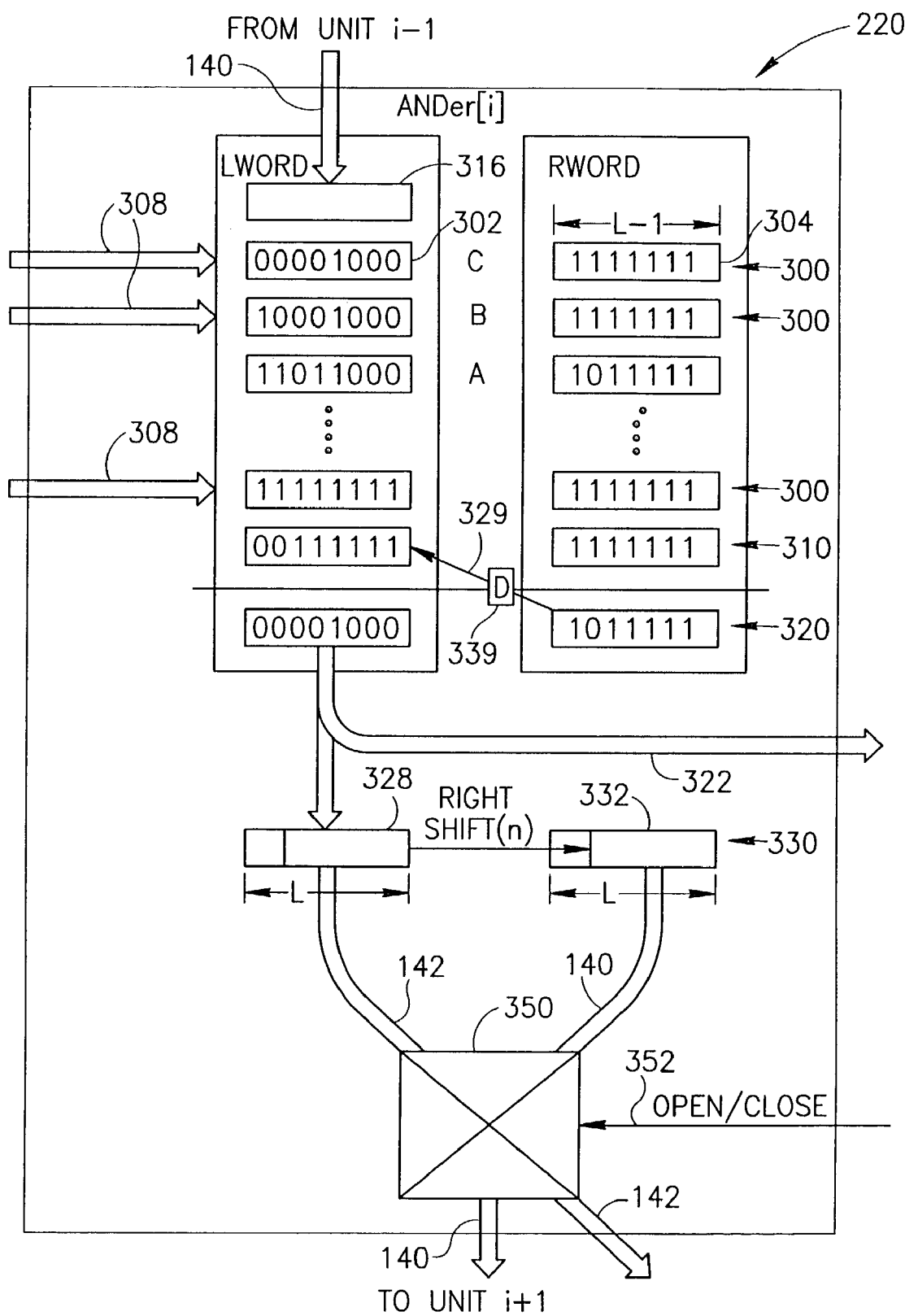
FIGS. 3A and 3B are schematic block diagrams of an AND unit of the searching machine of FIG. 1, with values of two consecutive operation cycles, in accordance with an exemplary embodiment of the present invention.

FIG. 3A is a schematic block diagram of AND unit 220, in accordance with an exemplary embodiment of the present invention. Optionally, AND unit 220 includes an array of L registers 300, each of which is formed of a left word 302 and a right word 304. Registers 300 receive the contents of respective buses 202 (FIG. 2) of shifting unit 215, as indicated by lines 308, such that left words 302 correspond to left bank 204 and right words 304 correspond to right words 206. A result register 320 receives a bit-wise AND of the contents of registers 300. The contents of a left word of result register 320 is optionally provided to result unit 230 (FIG. 2), on a result line 322. In some embodiments of the invention, the bit-wise AND operation is also performed on a feedback register 310 which is used in identifying pattern matches ranging over two consecutive text segments loaded to text window 102. Additional elements of AND unit 220 are required for handling patterns longer than L and will be described hereinbelow.

Feedback register 310 is optionally loaded with the AND result (i.e., the contents of result register 320) of a previous operation cycle of AND unit 220, shifted to the left by the length of text window 102, i.e., by L. Thus, the left word of feedback register 310 carries the contents of the right word of result register 320 of the previous cycle, as indicated by arrow 329. The right most position of the left word of feedback register 310, as well as the entire right word of the feedback register are constantly filled with '1's as these positions do not relate to the previous contents of text window 102. The transfer of the contents of result register 320 to feedback register 310 is delayed for one operation cycle of machine 100, optionally by a time delay unit 339.

The bits of the right word of result register 320 are indicative of whether a prefix of the pattern handled by the matching unit 120 ends at the end of text window 102 (FIG. 1). The number of possibilities of such prefixes is k-1, where k is the length of the pattern handled by matching unit 120. There are k-1 possible prefixes because the prefix can include 1, 2, . . . or k-1 letters of the pattern and must end at the end of text window 102. Therefore, if the handled pattern is of length L, all the L-1 positions of the right word of result register 320 are significant. In the example shown in FIG. 3A, only 2=k-1 positions (at the left of the right word) are significant and the remaining positions carry '1' bits, which are neutral in an AND operation.

The k-1 left columns of left words 302 are indicative of whether text window 102 includes suffixes of the pattern represented by matching unit 120, beginning at the left most position of text window 102. The reason that the left positions of left words 302 represent suffixes and not entire matches is because shift unit 215 shifts bit masks 135 to the right. The contents of feedback register 310 matches the bits indicative of prefixes of the pattern ending at the end (i.e., the right) of text window 102 during the previous cycle, with corresponding suffixes of the pattern beginning at the beginning (i.e., the left) of text window 102. Thus, the k-1 left bits of result register 320 are indicative of matches spanning over the previous and the current contents of text window 102.

In some embodiments of the invention, at the beginning of a new text stream, feedback register 310 is initialized to k-1 left '0's (k is the length of the pattern handled by the matching unit 120), followed by '1's. The '0's in the k-1 left positions of feedback register 310 indicate that no suffixes existed in the previous contents of text window 102, as the current contents of text window 102 are not related to any previous contents. In the example of FIG. 3A, feedback register 310 is initialized to '00111111', since the length of the searched pattern is k=3.

The contents of result register 320 due to the AND operation on registers 300 and 310, is '00001000 1011111'. The '1' bit in the fifth position from the left is indicative of the match of the pattern 'abc' ending at the fifth position of text window 102 (FIG. 1). The '1' bit at the left most position in the right word of result register 320 is indicative of the prefix 'ab' of the pattern ending at the end of text window 102 and missing only one additional character. The five right most '1' bits of result register 320 are located in positions indicative of prefixes of the pattern missing 3-7 characters, which in the present example are not in use (the pattern is of length 3). These positions are therefore set to '1'.

As described above, the left word of result register 320 is provided to result unit 230, optionally on a result line 322. The right word of result register 320 is passed to feedback register 310, for a following operation cycle.

Although result register 320 is referred to herein as a register, in some embodiments of the invention, as described below, result register 320 may be a bus which does not actively store results. The results are optionally stored in units receiving the contents of the bus, e.g., result unit 230. Alternatively or additionally, the results are stored in a shifted-result register 330 described below. Further alternatively or additionally, any other storage scheme may be used according to the pipelining method used, including a scheme in which the results are provided as output without requiring internal storage.

Similarly, although registers 300 are referred to herein as registers, in some embodiments of the invention, result registers 300 are buses which do not actively store results.

Figure 3B:
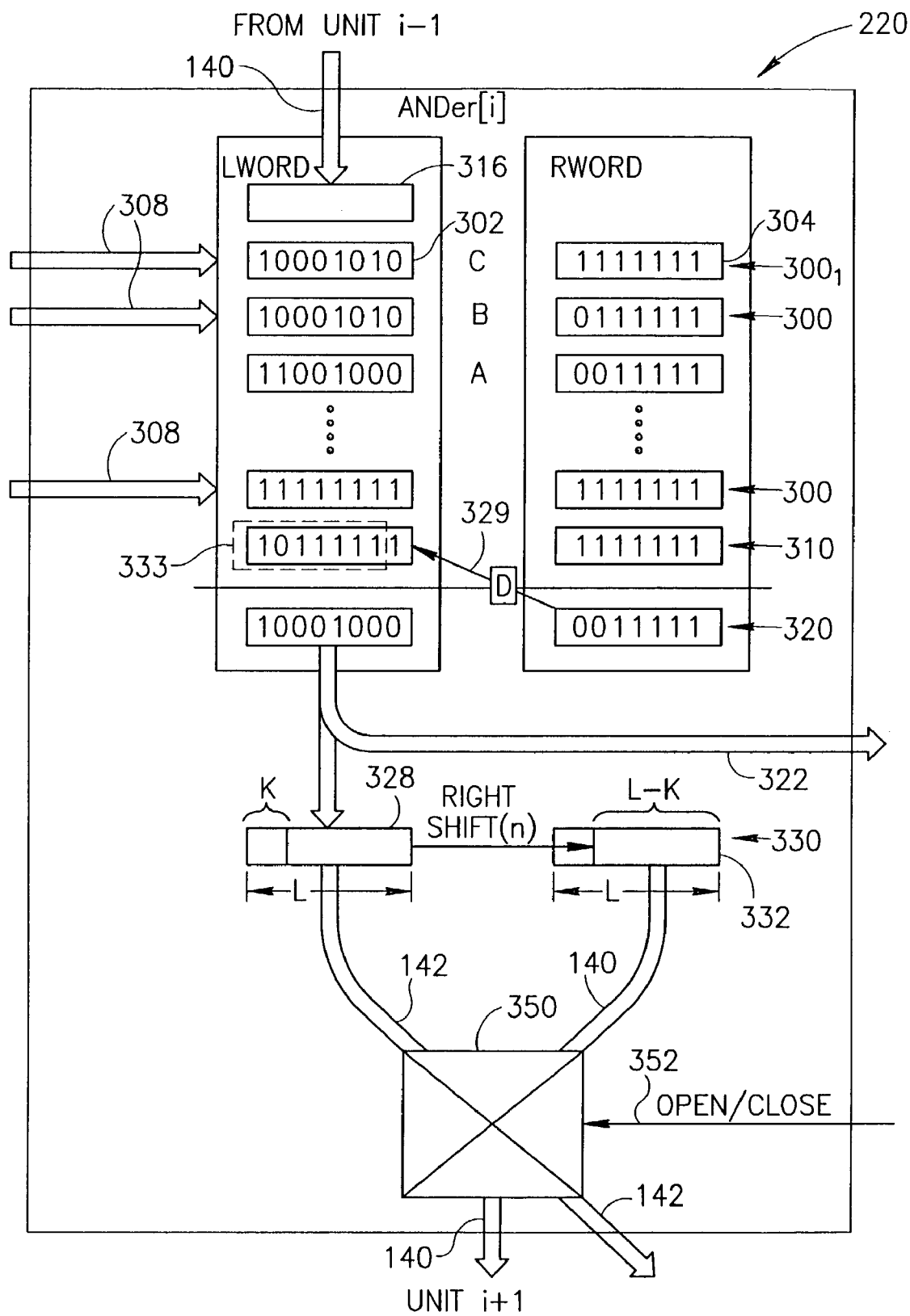

FIG. 3B is a schematic block diagram of AND unit 220, showing the operation of the AND unit during a consecutively following operation cycle to the cycle shown in FIG. 3A, in accordance with an exemplary embodiment of the present invention. Assuming that the contents of text window register 102 is "czabcbcd", the bit masks of 'a', 'b', and 'c' are '00100000', '00010100' and '10001010', respectively. After shifting by shift unit 215 (FIG. 2), registers 300 have the values shown in FIG. 3B. Feedback register 310 has the value of result register 320 from the previous cycle, shown in FIG. 3A, shifted by L positions to the left. The k-1 left positions of feedback register 310, shown in dotted frame 333, result from the k-1 bits of the right word of result register 320.

In the left most column of registers 300, register $300_1$, corresponding to the letter c, has a '1' bit indicating a match. The other registers 300 have '1' bits due to the shift. As feedback register 310 has a '1' bit in the left most position, due to the prefix 'ab', a match is indicated in the left most position of result register 320. An additional match is indicated in the fifth from left position of result register 320, corresponding to the appearance of the pattern 'abc' in text window 102, ending in the fifth from left position.

In some embodiments of the invention, as described above, pattern searching machine 100 is adapted to search for a pattern of a length greater than L.

Optionally, patterns longer than L are split into a plurality of sub-patterns. Optionally, each pattern is split into i sub-patterns, i-1 sub-patterns of length L and a last sub-pattern with the remaining portion of the pattern, having a length k. The i sub-patterns of the pattern are handled by i neighboring matching units 120, connected by arrows 140 and 142 (FIG. 1). In some embodiments of the invention, there is substantially no limit on the number of matching units 120 which can operate together is searching for a single pattern.

Each sub-pattern is optionally handled by a respective matching unit 120. For clarity of the following description, the matching units 120 used for the pattern are numbered according to the order of the sub-patterns they handle. Optionally, as shown in FIGS. 3A and 3B, the contents of result register 320 is passed through a shifted-result register 330 onto transfer lines 140 and 142 (shown in context in FIG. 1). The details of shifted-result register 330 are described below after the description of result unit 230, described with reference to FIG. 4. A gate 350 optionally allows or prevents the passage of the contents of shifted-result register 330 onto transfer lines 140 and 142, according to control signals on an open/close control line 352.

The control lines 352 in matching units 120 used for patterns not longer than L, are optionally configured to have their respective gate 350 closed. Thus, matching units 120 handling patterns not longer than L operate on their own without relation to other matching units 120. Control lines 352 of matching units 120 handling sub-patterns, except for those units 120 handling the last sub-pattern of a pattern, are configured to keep gate 350 open. Optionally, output lines 122 and 124 of matching units 120 (result units 230, thereof) handling non-last sub-patterns of a pattern are disabled and the matching result is provided on the output lines 122 and 124 of the last matching unit 120 of the pattern.

In some embodiments of the invention, AND unit 220 includes a carry over bus 316, which participates in the AND operation together with the left words 302 of registers 300 and the left portion of feedback register 310. Optionally, carry over bus 316 is of length L and participates in the AND operation with the left words 302 of registers 300. Carry over bus 316 optionally does not include a right word, since the right word in the current unit is indicative of prefixes which are not yet confirmed (were not checked for suffixes), and therefore it is not necessary to verify that the previous sub-unit had a match. It is noted, however, that in some embodiments, carry over bus 316 may be of the same length as registers 300, for example for implementation reasons.

The existence of a match in the previous sub unit, indicated by the contents of carry over bus 316, is optionally verified only after the existence of the suffix was confirmed. It is noted, however, that carry over bus 316 may include indications of partial matches which require confirmation for suffixes, as described below.

As mentioned above with reference to registers 300, carry over bus 316 may be implemented as a register which stores values. A carry over register may be used instead of other registers (e.g., register 330) which in such a case are implemented as buses instead of registers, or may be used in addition to other registers, in which case machine 100 will generally operate slower than if fewer registers, which store values, are used.

Alternatively to carry over bus 316 having a length L, bus 316 may have the same length as registers 300, e.g., 2L-1. In such cases, feedback register 310 (of the matching unit 120 receiving the carry over) will only indicate a prefix match if a corresponding prefix match was determined by the previous matching unit 120.

Carry over bus 316 optionally receives a portion of the contents of the result register 320 of the previous matching unit 120 (i.e., from the matching unit 120 shown above in FIG. 1), received over transfer line 140. Optionally, when gate 350 leading to carry over bus 316 is closed (i.e., gate 350 is located between units representing different patterns), the carry over bus 316 is neutralized, for example, by filling the carry over bus 316 with '1's so as not to interfere with the AND operation. When handling a new text stream, carry over bus 316 of a matching unit 120 not carrying a first sub-pattern of a pattern (i.e., not receiving input from a closed gate 350) is optionally initialized to all '0's, as no match could have been found with the previous sub-pattern at the beginning of the text stream.

Carry over bus 316 of a matching unit 120 (i+1) receives on line 140 the matching results of the preceding matching unit 120 (i), such that, generally, a match is not indicated in unit (i+1) for its sub-pattern, unless a match in a corresponding position was found for the previous sub-pattern in matching unit i. Thus, generally, the indication of a match in unit (i+1) indicates a match for all the sub-patterns up to the i+1 sub-pattern, in respective previous operation cycles of machine 100. In some embodiments of the invention, however, as described below, result register 320 of a matching unit 120 (i+1) representing a last sub-pattern of a pattern may provide a match indication even if only a prefix match was found in the previous matching unit (i). In such cases, result unit 230 determines whether a match exists in the text for the entire pattern, based on the data received on line 142, as described below with reference to FIG. 4.

When the sub-pattern handled by the receiving matching unit 120 is of length L, carry over bus 316 receives the left word of the result register 320 of the previous matching unit 120. This is because the distance between the end of the sub-pattern of matching unit i and the end of the sub-pattern of matching unit i+1 in the searched text is L positions (the length of the sub-pattern of unit i+1) for a match to exist, and the distance between the result bit masks of matching units i and i+1 is also L positions (the passage of one operation cycle). When, however, the sub-pattern of the receiving matching unit 120 has a length k smaller than L, the contents of result register 320 of the previous matching unit 120 needs to be shifted to the left L-k positions, on its way to carry over bus 316. The shift is required since the distance between the end of the sub-pattern of matching unit i and of the end of the sub-pattern of matching unit i+1 in the searched text must be k (the length of the sub-pattern of unit i+1), while the distance between the result bit masks is L. It is noted that in some embodiments of the invention, the left shift of L-k positions is achieved by shifting k positions to the right and L positions to the left, as described below.

It is noted that in shifting result register 320 of unit i to the left L-k positions, some of the bits from the right word of result register 320 enter into carry over bus 316 of unit i+1. The bits from the right word of result register 320 of unit i are indicative of whether prefix matches of the sub-pattern of unit i were found. Even if a match is indicated in result register 320 of unit i+1 based on the sub-pattern of unit i+1 and the prefix indications from unit i, it is not necessary that there is a match, as the results of the suffix determination of unit i were not received by unit i+1. In fact, the suffix determination in unit i is performed in parallel to the determination in unit i+1 which relates to the corresponding prefixes. Therefore, in some embodiments of the invention, result unit 230 of unit i+1 receives the suffix bits from unit i, on transfer line 142, in addition to the contents of result register 320 of unit i+1, on line 322. Result unit 230 then performs a final determination of whether a match is found, as is now described with reference to FIG. 4.

Figure 4:
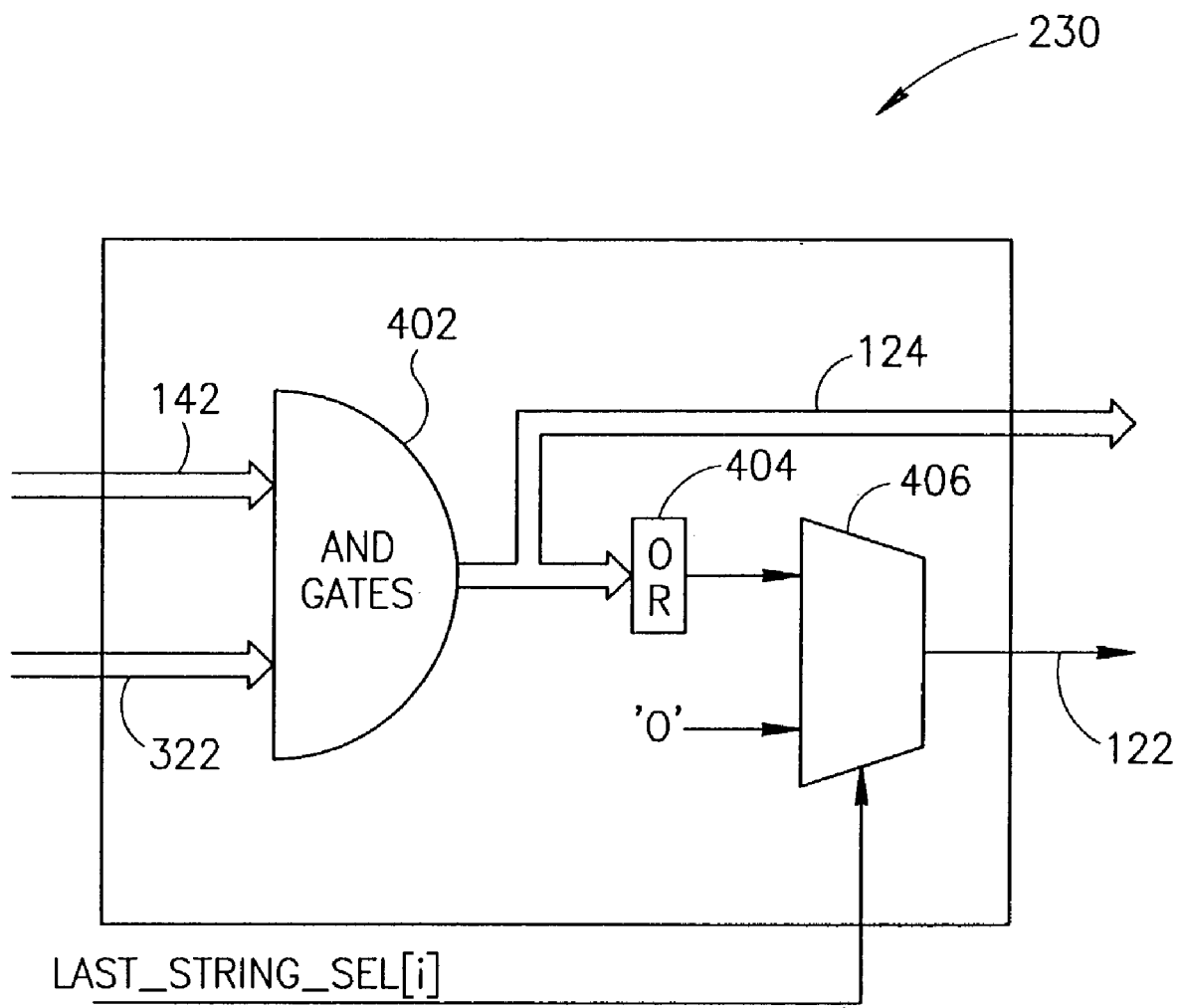
FIG. 4 is a schematic block diagram of a result unit of the searching machine of FIG. 1, in accordance with an exemplary embodiment of the present invention.

FIG. 4 is a schematic block diagram of result unit 230, in accordance with an embodiment of the present invention. Result unit 230 (reference is made here to unit i+1) optionally comprises a bit-wise AND gate 402 which performs an AND operation between the left word of result register 320 of unit i+1 received on result line 322 (FIG. 3A) and the suffix indication bits from unit i, received on transfer line 142. The results from bit-wise AND gate 402 are provided on position output line 124 and, in parallel, are passed to an OR gate 404 which provides a match indication. The match indication is '1' if the result from bit-wise AND gate 402 includes at least one '1' bit, i.e., at least one match was found. In some embodiments of the invention, a selection gate 406 or any other controlled gate, e.g., a strobe gate, controls the passage of the match indication from OR gate 404 to match indication output line 122. Optionally, the match indication from OR gate 404 is allowed to pass to output line 122 only if result unit 230 belongs to a unit handling the last sub-pattern (or the only sub-pattern) of a pattern.

In some embodiments of the invention, result unit 230 provides on line 124, as shown in FIG. 4, L bits corresponding to the L locations of window 102. Alternatively or additionally, some or all of result units 230 include an encoder (not shown) which indicates the position of the matches found. Optionally, the position in which a '1' bit appears in the search result on line 124 is indicative of the last point in the text of a portion matching the pattern. In some embodiments of the invention, the position in the current text window is indicated as the log of the search result on line 124. Optionally, in addition to the encoder, result unit 230 includes a counter which keeps track of the number of text windows 102 passing from the beginning of the text until the pipeline stage of result unit 230. The position of the match is optionally determined as the number of analyzed text windows from the beginning of the text multiplied by L, plus the position of the match indication in the current window on result output line 124.

In some embodiments of the invention, result unit 230 also provides an indication of the number of matches found and/or provides a multi-match flag when more than one match was found. Optionally, an analog multi-match line, as known in the art, is used to determine the number of matches found. Alternatively, digital logic is used for the determination of the number of matches found. Optionally, when a plurality of matches are found, the position of the first match or of a predefined number of matches is/are provided by a priority encoder. Alternatively or additionally, different positions have different priorities and the position having the highest priority is provided by the priority encoder.

Alternatively to positioning selection gate 406 after OR gate 404, selection gate 406 is positioned before OR gate 404, disabling position output line 124, in addition to indication output line 122. Further alternatively or additionally, the operation of selection gate 406 is performed by an additional input of AND gate 402 and/or by zeroing the contents of line 142.

Referring in detail to the transfer of the contents of result register 320 on lines 140 and 142, in an exemplary embodiment of the invention, as shown in FIGS. 3A and 3B, shifted-result register 330 includes a left word 328 and a right word 332, both of which are of length L. The left word of result register 320 is loaded into shifted-result register 330, shifted to the right (from the left end of register 330) by the length k of the sub-pattern handled by the following unit i+1. The positions of shifted-result register 330 not occupied by the loaded result from result register 320 are optionally filled with '1's which are neutral in AND operations. In some embodiments of the invention, a multiplexer (not shown) is used to load the contents of the left word of result register 320 into the correct position of shifted-result register 330.

Optionally, the left word 328 of shifted-result register 330 is transferred on line 142 and the right word 332 is transferred on line 140.

If the length of the sub-pattern handled by the following unit (i+1) is L, the left word of result register 320 is loaded into shifted-result register 330 shifted L positions to the right, such that the contents of the left word of result register 320 are passed entirely on line 140. In this case, line 142 carries all '1's, as it is not possible that a pattern suffix is found by unit i at a same operation cycle as unit i+1 finds a match with the end of the pattern.

If the length k of the sub-pattern handled by the following unit (i+1) is smaller than L, the left word of result register 320 is loaded into shifted-result register 330 shifted k positions to the right. Optionally, this may happen only in the next to last unit of a pattern, as all the sub-patterns except for the last have the length L. Right word 332 of shifted-result register 330, passed on transfer line 140, includes the k right most bits of the left word of result register 320. These k bits are indicative of matches of the sub-pattern of unit i appearing in the text in positions ending in a left side of text window 102, such that a subsequent appearance of the sub-pattern of unit i+1, and hence the entire pattern, ends in the same operation cycle of searching machine 100 (i.e., without changing the contents of text window 102). In addition, right word 332 of shifted-result register 330, passed on line 140, includes L-k '1' bits which correspond to prefixes of the sub-pattern of unit i. The '1' bits allow AND unit 220 of the following matching unit i+1 to find a match, regardless of whether unit i has a match of its sub-pattern. Result unit 230 of matching unit i+1 will then determine if the matches found in unit i+1 correspond to matches in unit i and are matches of the entire pattern.

Left word 328 of register 330 of unit i optionally includes '1' bits in its k left most positions and L-k bits from the left of result register 320, in its right positions. The L-k bits from result register 320 indicate matches of the sub-pattern of unit i, which correspond to L-k match possibilities in unit i+1, which can end in the same content of text window 102 as the matches of the sub-portion of unit i. The AND operation of result unit 230 determines whether a match was found by both of units i and i+1 and hence whether there is a match of the entire pattern. The k '1' bits on the left correspond to k match possibilities in unit i+1 which end in a separate segment of the text and therefore do not require an AND operation determination with the bits of the sub-pattern of unit i, by result unit 230.

Alternatively to filling the positions of shifted-result register 330 to the right of the loaded result (from result register 320) with '1's, as many bits as fit of the right word of result register 320 are loaded into the positions to the right of the loaded result. Thus, a match of unit i+1 which is an optional match of the pattern (to be determined by result unit 230) is indicated only if a prefix match is found in unit i. In addition, this alternative allows simpler providing of intermediate results. In some embodiments of the invention, the alternative selected is chosen according to the implementation hardware requirements.

Figure 5A:
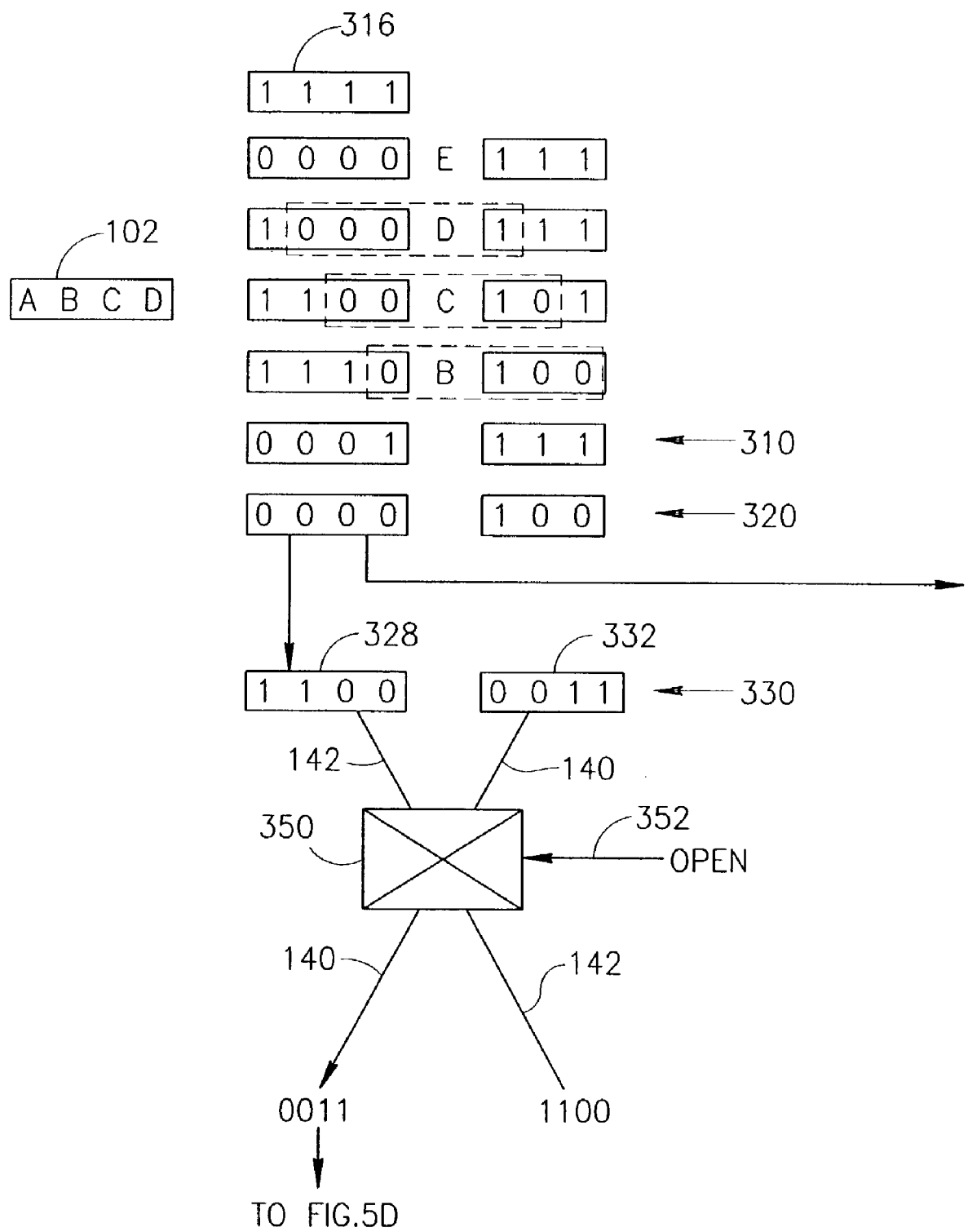
FIGS. 5A-5D illustrate an example of finding a match of a pattern longer than a text window of a length L, in accordance with an embodiment of the present invention.
Figure 5B:
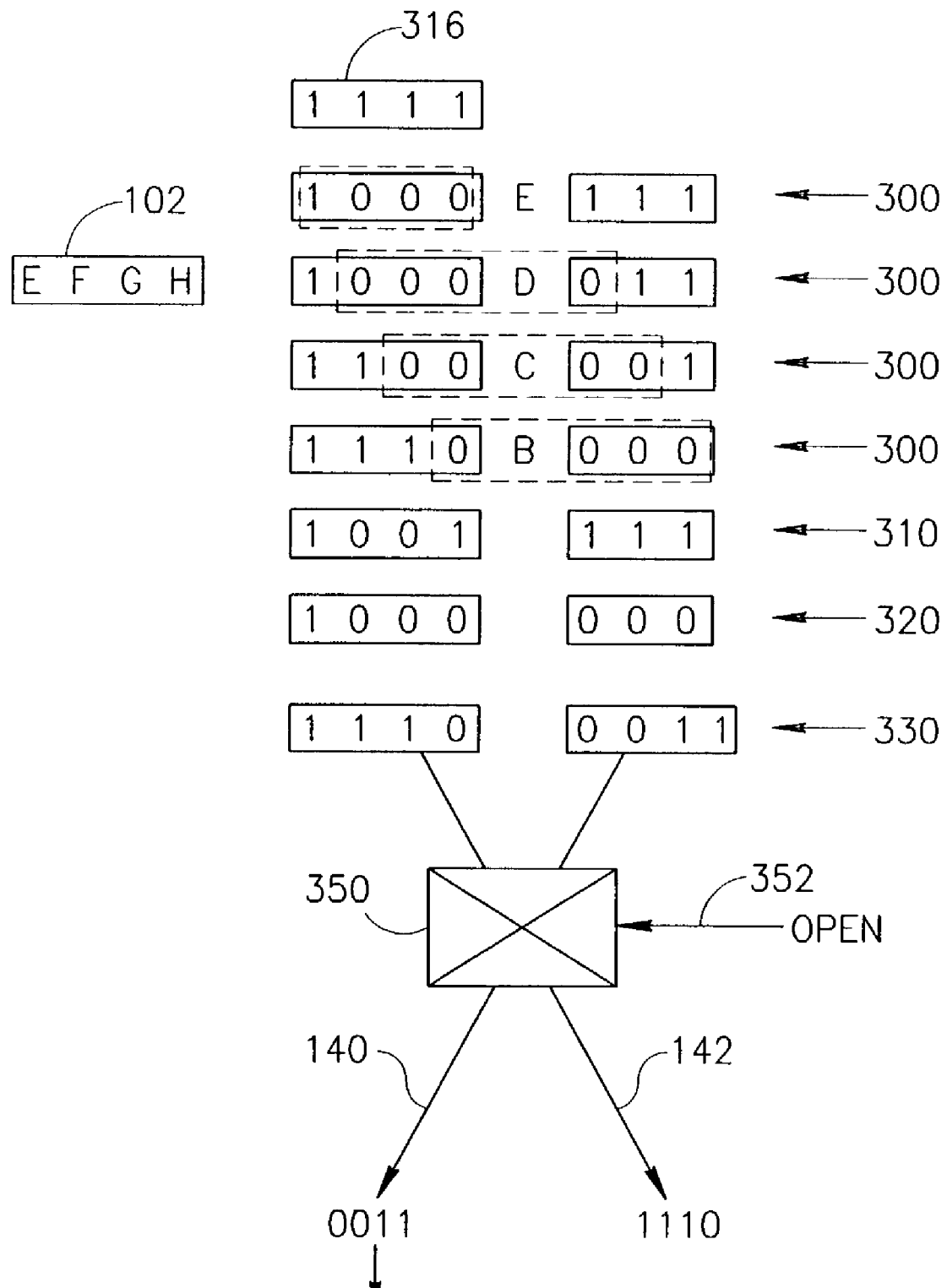
Figure 5C:
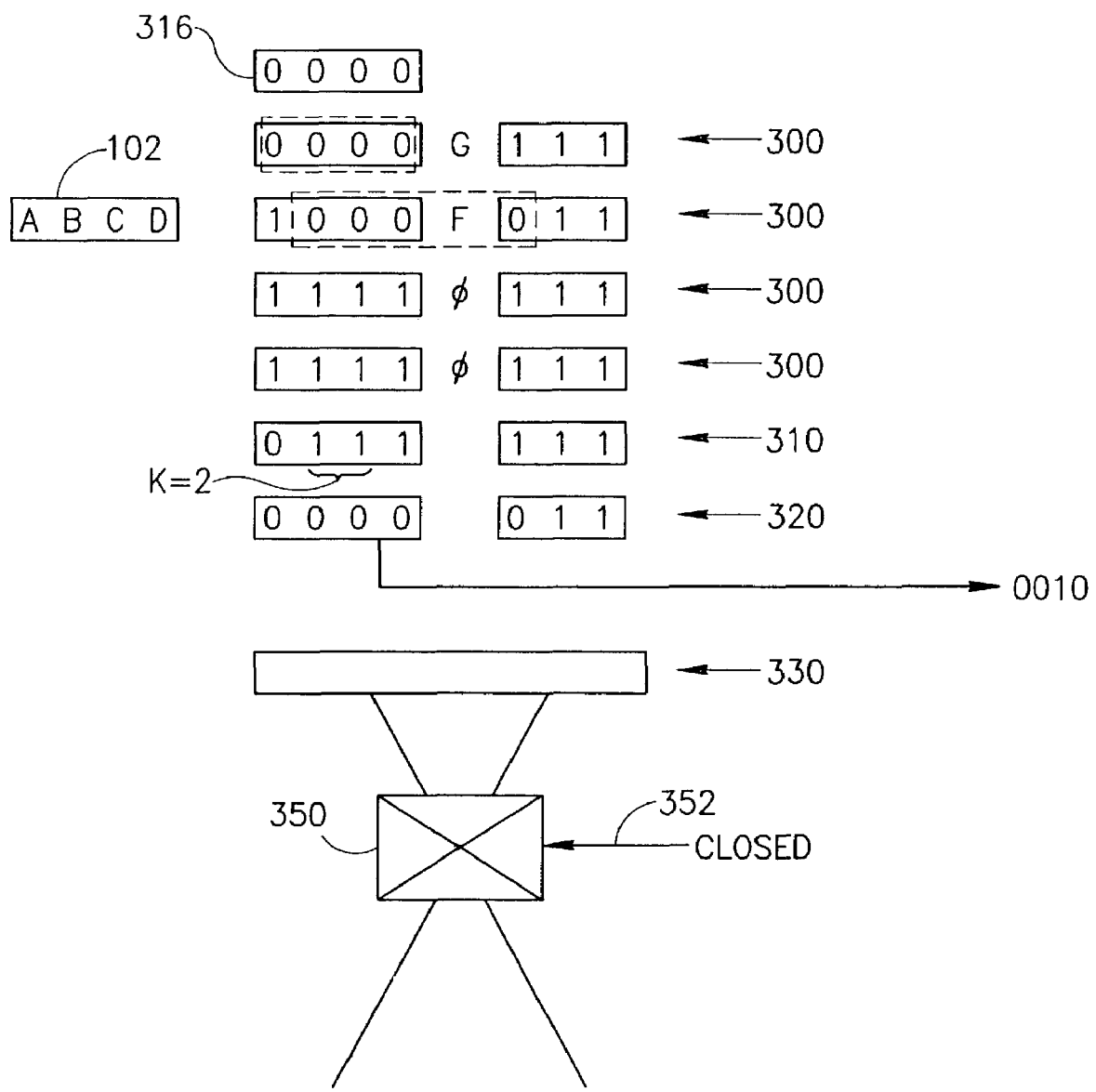
Figure 5D:
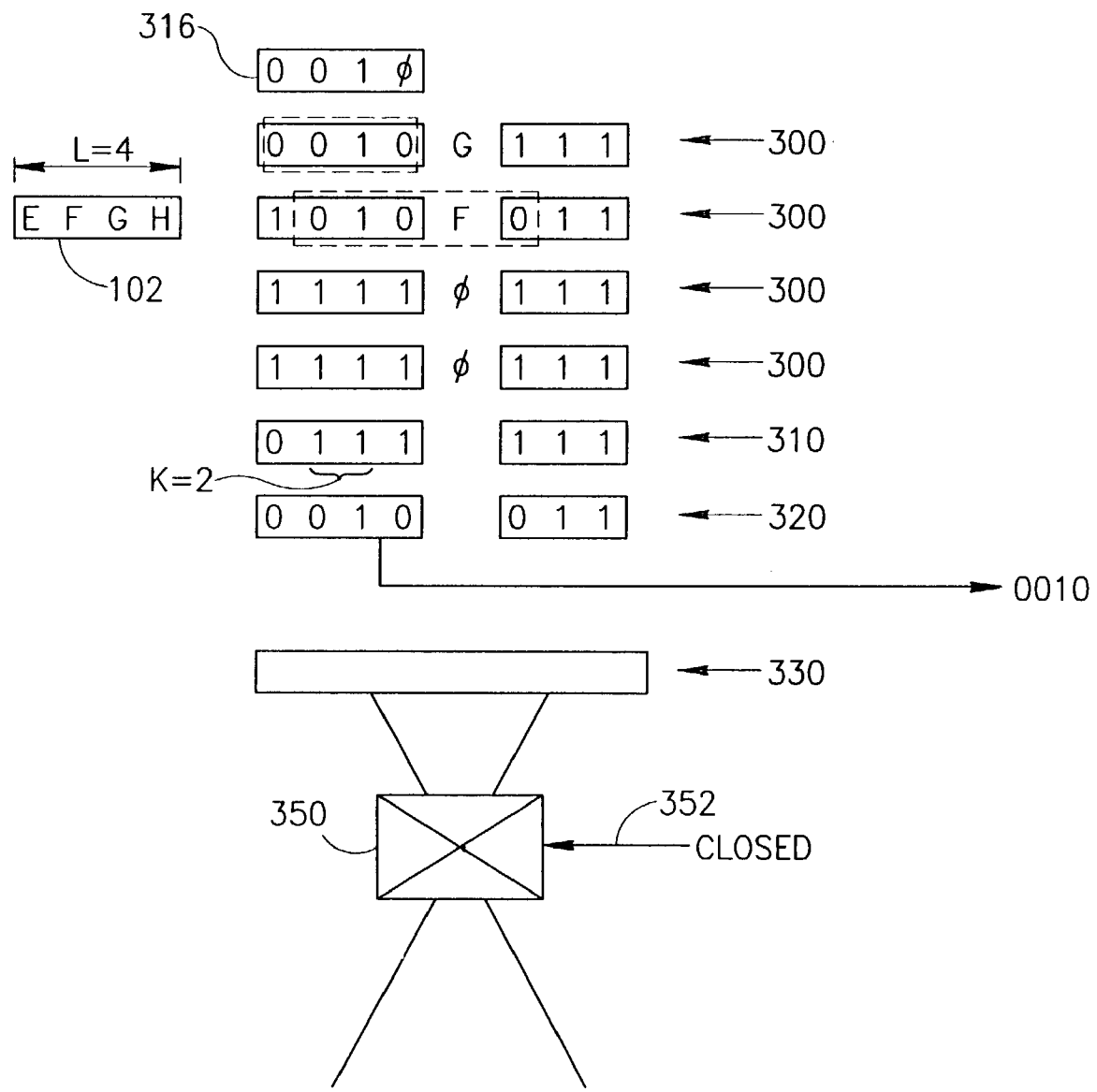

An example of finding a match longer than L is now described with reference to FIGS. 5A-5D which are schematic illustrations of AND unit 220, with values of the example. FIGS. 5A and 5B are of a unit i and FIGS. 5C and 5D are of a unit i+1. FIGS. 5A and 5C are of a first operation cycle and FIGS. 5B and 5D are of a second operation cycle.

The example relates to a search for the pattern "BCDEFG" in a text "ABCDEFGH". For the simplicity of the example, a text window 102 of four positions (L=4) is used. A first unit (the AND unit 220 of which is shown in FIGS. 5A and 5B) searches for the sub-pattern "BCDE", and a second unit (the AND unit 220 of which is shown in FIGS. 5C and 5D) searches for the sub-pattern "FG", which has a length k=2. In the first unit, shown in FIGS. 5A and 5B, carry over bus 316 is always '1111', as this unit is the first unit of the pattern and the gate 350 from which it would receive transfer line 140 is closed. In a first operation cycle, text window 102 includes the pattern "ABCD". As shown in FIG. 5A, result register 320 indicates no full matches (i.e., the left word is all '0's) and a prefix match missing one character, in the first position from left of the right word. As the pattern of the second unit has a length k=2, result register 320 is shifted 2 positions to the right into shifted-result register 330. The right word 332 of register 330 ('0011' in FIG. 5A) is provided to the second unit for use in a next operation cycle, shown in FIG. 5D. The left word of result register 320 ('0011' in FIG. 5A) is provided to the result unit 230 of the first matching unit 120, which does not indicate a match in any event, since it does not represent the last sub-pattern of a pattern. The left word 328 of register 330 of the first unit is provided to the result unit 230 of the second matching unit 120, together with the results '0000' of matching the current contents ("ABCD") of text window 102 with the pattern "FG".

In the second matching unit 120, as shown in FIG. 5C, carry over bus 316 is initialized to '0000', optionally by setting the value of the register 330 leading to carry over bus 316, since a match of the previous sub-pattern 'BCDE' could not have been found (the text stream has just begun). Result register 320 indicates no match, in the left word of the result register and no prefix match in the left-most bit of the right word of the result register. Even if text window 102 included in this cycle the sub-pattern 'FG', a complete match would not be indicated due to the '0000' values of carry over bus 316.

In a second operation cycle, text window 102 carries the sequence "EFGH". In the first matching unit 120, shown in FIG. 5B, result register 320 includes a match indication in the most left position, indicative of a match ending in the most left position of text window 102. In shifted-result register 330, the contents of result register 320 are shifted to the right in two positions (k=2).

During the same operation cycle, in the second matching unit (shown in FIG. 5D), a match is found in the third position from the left. This match is allowed by the contents of carry over bus 316 (i.e., a '1' bit in the third from left position). It is noted, however, that only an AND operation performed between the left word of result register 320 (0010), shown in FIG. 5C, and the contents of line 142 (1110) shown in FIG. 5B, confirms the match. This AND operation is performed during a third operation cycle by the result unit 230 of the second matching unit.

In an exemplary embodiment of the invention, in a first pipeline cycle, bit masks are generated for the contents of text window 102 in each masking unit 120 separately. In a second pipeline cycle, the generated bit masks are passed through shifting wires to registers 300 where they participate in the AND operation and the results settle in shifted-result register 330 before the end of the second cycle. In the second cycle, the contents of the right word of result register 320 from a previous cycle are passed to the left word of feedback register 310. In addition, carry over bus 316 is filled from the contents of result register 320 of the previous cycle, through shifted-result register 330. In a third pipeline cycle, result unit 230 performs an AND operation between the contents of result register 320 from a previous cycle and the contents of transfer line 142 providing values from the result register of the previous matching unit 120 from a previous cycle.

In another exemplary embodiment of the invention, in a first pipeline cycle, bit masks are generated for the contents of text window 102 in each masking unit 120 separately. The generated bit masks are passed through shifting wires to registers 300 where they settle before the end of the first pipeline cycle. In this first cycle, the contents of the right word of result register 320 from a previous cycle are passed to the left word of feedback register 310. In addition, carry over bus 316 is filled from the contents of result register 320 of the previous cycle, through shifted-result register 330. In addition, an AND operation is performed, filling result register 320 with a new result value. In a second pipeline cycle, result unit 230 performs an AND operation between the contents of result register 320 and the contents of transfer line 142 providing values from the result register of the previous matching unit 120 from a previous cycle.

It is noted that the above pipelining schemes are brought only by way of example, and any other pipeline divisions may be used, in accordance with the time and/or architecture constraints imposed on the operation and/or structure of machine 100. Alternatively to gate 350 having only two positions, the gate may have different states for the matching unit 120 of the next-to-last sub-pattern, and for matching units 120 of earlier sub-patterns. Optionally, in this alternative, for the next-to-last sub-pattern, gate 350 is set to an open state in which values pass on both of lines 140 and 142. In matching units of sub-patterns before the next to last, gate 350 is optionally set to a partially-closed operation state in which values are passed only on line 140, while line 142 is closed. Alternatively or additionally, the closing of gate 350 is performed by forcing '1' bits to pass on line 140 and/or line 142.

Alternatively to using shifted-result register 330 to shift the contents of result register 320 according to the length k of the sub-pattern of the following unit, all patterns longer than L are padded with don't care characters to a length divisible by L. In this alternative, carry over bus 316 of unit i+1 optionally receives the contents of the left word of result register 320 of unit i without any shift. Transfer line 142 and AND gate 402 are optionally not used in this alternative. In some embodiments of the invention, the text stream searched is padded with L-1 pseudo characters at its end, such that a match will be found with any pattern padded with don't care characters. Alternatively, the text stream is padded with a number of pseudo characters equal to the maximal number of padding don't care characters used for the patterns currently handled by machine 100.

In some embodiments of the invention, the padded pseudo characters in the text match only don't care characters in patterns. Alternatively, the padded pseudo characters in the text match any character in the pattern. In this alternative, result unit 230 and/or a unit receiving the results correct the positions of the match indications in order to remove the effect of the padded don't care characters. Alternatively or additionally, result unit 230 and/or a unit receiving the results eliminate match indications which end in the padded portion of the text.

In some embodiments of the invention, each character includes 8 bits as is customary in the art. Alternatively, for example when used in environments with other character sizes, machine 100 may be used with characters of other lengths.

Alternatively or additionally, in order to limit the number of possible characters, characters of a smaller number of bits are arbitrarily used. For example, instead of using L=10 characters, each character being of eight bits, the search is performed with L=20 characters of 4 bits each. In this alternative, the sizes of the multiplexers 212 required are much smaller, although shift units 215, AND units 220 and result units 230 are larger (operate on words of 2L). Optionally, in this alternative, matches in odd positions are ignored, as they relate to artificial matches due to the division into small characters.

Further alternatively or additionally, different character lengths are used by mask generating unit 104 and by matching units 120. Optionally, the bit masks 135 generated by unit 104 correspond to character portions and have a length of L/x characters, x being for example 2, 3 or 4. Each multiplexer unit 217 optionally includes a plurality (x*L) of multiplexers 112 which retrieve bit masks 135 of character portions. The shift units 215 further comprise AND units which combine each x bit masks of character portions into a single character bit mask, according to the patterns searched for by the specific matching unit 120. In this alternative, the number of inputs to each multiplexer is reduced by increasing the number of multiplexers.

In some embodiments of the invention, instead of using a central mask generating unit 104 and multiplexers 212 to lead the bit masks to shift units 215, each matching unit 120 has its own bit mask generator. The use of separate bit mask generators for each unit 120, eliminates the need for large multiplexers 212. In addition, the number of generated bit masks is limited to L in each matching unit 120, regardless of the number of possible bit masks relating to groups of characters. These embodiments are especially useful when the number of possible characters searched for in the text is a large percentage of the possible combinations of bits. When, however, the number of characters (and character groups) in the searched patterns is relatively small, such as in certain DNA applications, the use of a central mask generating unit 104 may be advantageous.

In some embodiments of the invention, the patterns searched for by search machine 100 are divided into context groups. The patterns of each context group are optionally handled by different software routines and/or by different hardware units. Optionally, the output lines 122 and/or 124 of units of a single context group are passed to a single result concentrating unit which indicates a context match and optionally the pattern for which the match was found. In some embodiments of the invention, each pattern in the context group is assigned a priority and when a plurality of matches are found in the single context group, the pattern with the highest priority is indicated.

Optionally, the result concentrating units are implemented using a content addressable memory (CAM) and/or methods known for use with CAMs. Alternatively or additionally, any other methods known for use with CAMs may be used with search machine 100. In some embodiments of the invention, CAMs and/or CAM methods are used for other parts of machine 100, such as bit mask generating unit 104, result unit 230 and/or alphabet match array 106.

Optionally, instead of using a single machine 100 to search for a plurality of patterns, a plurality of search machines 100 are used in parallel. Optionally, the different machines used have text windows 102 with different lengths. For example, a first machine may have a text window with a length of L=6 and a second machine with a text window of length L=10. Optionally, the machine 100 used to search for a specific pattern is selected according to the length of the pattern to achieve maximal utilization. For example, relating to patterns of length up to 20, patterns of length 1-6 and 11-18, are optionally searched for in the machine of L=6, while patterns of lengths 7-10 and 19-20 are searched for in the machine of L=10. In some embodiments of the invention, when one machine is fully utilized, the other machine handles the remaining patterns even if they are not of the desired size. In some embodiments of the invention, the different search machines 100 operate at different rates corresponding to their text window lengths, such that the search machines pass over the same number of characters of the text in a given time.

Alternatively or additionally, a plurality of search machines 100 are used one after the other, optionally in accordance with a pipelining scheme. Optionally, a first searching machine 100 searches for patterns which determine the general context of the searched text streams. A second searching machine 100 searches the text streams for specific patterns selected according to the general context determined by the first searching machine 100. For example, in searching through packets, the first searching machine 100 may search for the protocol of the packet, while the second search machine searches for specific keywords used in packets of that protocol.

Optionally, the second machine includes a large number of matching units 120 which are configured with different search patterns. The results of the first search machine are used to disable matching units 120 not to be used in the search of the current text stream. Alternatively or additionally, the results of the first machine determine which patterns are to be loaded into the matching units 120 of the second machine. In this alternative, the second search machine optionally loads the patterns it is to handle at a fast rate, optionally at the operation rate of the first machine.

In some embodiments of the invention, when a match is found by the first machine, the first machine immediately passes the entire current text stream it is searching and moves to search a next text stream. The second machine then optionally reviews the entire text stream or the portion of the text stream following the match found by the first machine, according to the specific application.

In some embodiments of the invention, the structure of machine 100 is adapted according to the expected patterns to be searched for by the machine. For example, according to the distributions of the lengths of the patterns expected to be searched for by the machine various optimizations and/or simplifications of the hardware of machine 100 may be performed. A few exemplary simplifications are now described.

In some embodiments of the invention, instead of all of matching units 120 having connections to other units through transfer lines 140 and 142, some of the units 120 are dedicated for searching for short patterns only. For example, if it is known that at least 20% of units 120 will be used for patterns shorter than L, 20% of the units 120 of machine 100 are isolated units which do not have controllable gates 350. This saves on the number of transistors required in implementing matching unit 120, as transfer lines 140 and 142 are not required and result unit 230 may be made simpler.

Alternatively or additionally, a certain percentage of the matching units 120 are organized in an array in which each second, third or j-th unit does not have transfer lines 140 and 142 leading to the following matching unit 120, or has only transfer lines 140. The frequency of matching units 120 not including transfer lines 140 and 142 leading therefrom (i.e., the value of j), is optionally determined according to the most common length of patterns handled by searching machine 100.

Optionally, when search machine 100 is expected to be used in searching for a plurality of patterns having a common prefix sub-pattern of length L or more, at least one of matching units 120 is connected through transfer lines 140 and 142 to a plurality of other matching units 120 (e.g., in a tree structure). Thus, the results of one matching unit 120 (representing a specific pattern portion) may be used in searching for a plurality of patterns including the specific pattern portion. This option is possibly used, when at least a portion of search machine 100 is implemented in software, such that the wire routing required is not large. Alternatively or additionally, this option is used only for a small number of matching units 120 and/or in a dedicated search machine in which the patterns to be searched for are known at the time of design and the design is configured accordingly.

In some of matching units 120, the multiplexer used in transferring the result between register 320 and shifted-result register 330 is restricted to a specific shift amount or to a predetermined range/number of allowed shift amounts. Such restrictions generally reduce the size and complexity of the multiplexer and optionally other hardware of machine 100, without affecting window size L, although restricting the lengths of patterns which can be handled by the matching units. Optionally, according to statistics on the expected lengths of patterns, specific matching units are dedicated for use with patterns of specific lengths or length ranges. In an exemplary embodiment of the invention, a first group of units 120 are dedicated for use with patterns of up to 5 positions and a second group of units 120 are dedicated for use with patterns of between 6-10 positions. Optionally, a third group of units 120 are adapted for use with patterns of any length. Alternatively or additionally, different groups of units 120 are dedicated for use with odd and even length patterns.

In some embodiments of the invention, one or more of matching units 120, are dedicated for handling partial patterns of a length not greater than a maximal length K, which is smaller than L. The units 120 for partial patterns require fewer multiplexers, or comparators when separate bit mask generators are included in each unit 120, than regular matching units 120. In determining the patterns handled by respective matching units 120, short patterns are first assigned to units capable of handling only partial patterns, if possible. Optionally, the units for handling partial patterns are a sub-group of the short pattern units which do not have transfer lines 140 and 142, as described above. Alternatively or additionally, one or more of the partial pattern units are included in the group of regular units 120, for use as a last unit of a long pattern (i.e., having a length greater than L). Optionally, the units 120 for partial patterns require the same amount of time for operation as the regular units 120.

Alternatively or additionally, one or more matching units 120 are dedicated for handling patterns that include repetitious characters (e.g., "abccaba"). The number of multiplexers required for such patterns including repetitious characters is lower than required for regular matching units. Optionally, one or more units 120 are dedicated for use with either partial patterns (having up to K characters) or for patterns having up to K<L distinct characters.

In some embodiments of the invention, patterns searched for by search machine 100 may include wild card characters which match a plurality of characters. When such wild cards are defined, bit mask generating unit 104 prepares separate bit masks for each wild card group, in addition to the single character bit masks. Thus, in these embodiments, array 106 may store more bit masks than known ASCII characters and/or than characters recognized by machine 100.

In some embodiments of the invention, high level control methods known in the art and/or complex pattern formation methods may be used in searching for various complex patterns using search machine 100. For example, in searching for a pattern beginning with 'lr' ending with 't' and between them up to a predetermined number of any characters not including spaces (lr*t), a first matching unit 120 is assigned to search for 'lr', a second unit 120, searches for 't' and a third unit searches for spaces. A match is indicated if a match is found by the second unit up to a predetermined number of positions after a match of the first unit, provided a match is not indicated by the third unit, therebetween.

In some embodiments of the invention, some of matching units 120 are dedicated to indicate non-matches of their pattern. Alternatively or additionally, some of matching units 120 may be configured to indicate a pattern match or a non-match depending on a user setting. Optionally, a NOT gate is added in result unit 230 of these matching units, before and/or after and gates 402 and/or OR gate 404.

In some embodiments of the invention, "not" gates may be configured to operate on some or all of transfer lines 140 and 142 so as to allow for search of complex patterns formed of characters which need to be in the text as well as characters which should not be in the text.

In some embodiments of the invention, search machine 100 is adapted to search for pattern similarities within a text, rather than for exact matches. For example, search machine 100 may search for text sub-strings having at least a predetermined percentage (e.g., 70%) of characters identical to a searched pattern. Optionally, instead of performing an AND operation between the contents of registers 300, an analog multiple match line is used to identify that at least a predetermined number of matches is found. Alternatively, a digital unit is used to identify that at least the predetermined number of matches are found. Optionally, each position of the feedback register 310 is given a weight in the determination according to the length of the prefix represented by the position in the feedback register.

In some embodiments of the invention, search machine 100 is implemented by an application specific integrated circuit (ASIC). Alternatively or additionally, search machine 100 is implemented by a field programmable gate array (FPGA). Further alternatively or additionally, search machine 100 is implemented by a programmable logic device (PLD) and/or by any other suitable hardware circuit. In an exemplary embodiment of the invention, search machine 100 is implemented by a CAM (or a circuit which uses CAM technology) for generating the bit maps, and an FPGA or ASIC for matching units 120.

In an exemplary embodiment of the present invention, searching machine 100 is used to search packets passing through a network element, such as a router, proxy and/or load balancer. For example, a monitoring unit may be used to search for key words, such as HTTP and GET. Alternatively or additionally, search machine 100 may be used for identification of patterns related to intrusion detection. Optionally, the rate at which the packets are received is up to about 10 Gbps. In an exemplary embodiment of the invention, search machine 100 operates at a rate of 100 MHz with a window of length L=10.

In some embodiments of the invention, the patterns searched for by machine 100 are divided into a plurality of groups referred to herein as contexts. Optionally, a context match line is provided for each context whether a match was found. The context match lines of the contexts are optionally received by a further processing unit which determines accordingly whether to check each specific match line of units 120 of the contexts. In some embodiments of the invention, the further processing unit receives the context match indications on an interrupt line, each context optionally having a separate interrupt procedure address.

Although in the above description long patterns are divided into one or more sub-patters of length L and a last sub-pattern which may be shorter than L, in some embodiments of the invention, long patterns may be divided in any other manner, including non-uniform divisions (e.g., 23 characters may be divided to 5, 8 and 10). The contents of result register 320 are shifted into result register 330 according to the sizes of the sub-patterns. Such non-uniform division into sub-patterns may be used, for example, when matching units 120 are organized in a tree structure. In an exemplary embodiment of the invention, such a tree structure is used in searching for file paths.

When, however, the sub-pattern of the receiving matching unit 120 has a length k smaller than L, the contents of result register 320 of the previous matching unit 120 needs to be shifted to the left L-k positions, on its way to carry over bus 316. The shift is required since the distance between the end of the sub-pattern of matching unit i and of the end of the sub-pattern of matching unit i+1 in the searched text must be k (the length of the sub-pattern of unit i+1), while the distance between the result bit masks is L. It is noted that in some embodiments of the invention, the left shift of L-k positions is achieved by shifting k positions to the right and L positions to the left, as described below with reference to FIG. 3B.

It is noted that in shifting result register 320 of unit i to the left L-k positions, some of the bits from the right word of result register 320 enter into carry over bus 316 of unit i+1. The bits from the right word of result register 320 of unit i are indicative of whether prefix matches of the sub-pattern of unit i were found. Even if a match is indicated in result register 320 of unit i+1 based on the sub-pattern of unit i+1 and the prefix indications from unit i, it is not necessary that there is a match, as the results of the suffix determination of unit i were not received by unit i+1. In fact, the suffix determination in unit i is performed in parallel to the determination in unit i+1 which relates to the corresponding prefixes. Therefore, in some embodiments of the invention, result unit 230 of unit i+1 receives the suffix bits from unit i, on transfer line 142, in addition to the contents of result register 320 of unit i+1, on line 322. Result unit 230 then performs a final determination of whether a match is found, as is now described with reference to FIG. 4.

It is noted that although the above description relates to a dedicated hardware searching machine, the method of the present invention may be applied advantageously also by a general purpose processor with suitable software.

It will be appreciated that the above described methods may be varied in many ways, including, changing the order of steps, and/or performing a plurality of steps concurrently. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. For example, the patterns may be stored in their original order "ABC" rather than being reversed "CBA". The shift amounts of registers 215 are optionally adapted accordingly. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore may include structure, acts or details of structures and acts that may not be essential to the invention and which are described as examples. Stricture and acts described herein are replaceable by equivalents which perform the same function, even if the structure or acts are different, as known in the art. Therefore, the scope of the invention is limited only by the limitations used in the claims. When used in the following claims, the terms "comprise", "include", "have" and their conjugates mean "including but not limited to".

The invention claimed is:

1. A method of searching a text for a pattern, comprising:
receiving at least one portion of the text;
providing a pattern to be searched for in the text;
generating, in accordance with the at least one portion of the text, a plurality of bit masks each representing one or more characters, each bit mask indicating for each position in the at least one portion whether the position carries one of the one or more characters represented by the bit mask;
performing bit-wise operations indicative of whether the pattern is found in the at least one portion, on the generated bit masks; and
providing an indication of whether the pattern appears in the text, responsive to the performed bit-wise operations.

2. A method according to claim 1, wherein receiving the at least one portion of the text comprises receiving a plurality of consecutive portions of the text.

3. A method according to claim 2, wherein each portion of the plurality of consecutive portions has a same length.

4. A method according to claim 2, wherein at any time only a single portion of the text is processed.

5. A method according to claim 2, wherein after beginning to handle a portion of the text, previous portions of the text are not handled.

6. A method according to claim 1, wherein generating the plurality of bit masks comprises generating bit masks for each of the possible characters in the text and selecting bit masks corresponding to characters in the pattern.

7. A method according to claim 1, wherein generating the plurality of bit masks comprises generating bit masks for each of the characters or groups in the pattern.

8. A method according to claim 1, wherein generating the plurality of bit masks comprises generating bit masks in which each bit corresponds to a single position in the at least one portion of the text.

9. A method according to claim 1, wherein generating the plurality of bit masks comprises generating bit masks such that each position in the at least one portion of the text corresponds to a plurality of bits in the bit mask.

10. A method according to claim 1, wherein performing the bit-wise operations comprises shifting at least one of the bit masks according to the position of its respective one or more characters in the pattern.

11. A method according to claim 10, wherein generating the plurality of bit masks comprises generating a number of bit masks equal to the number of characters in the at least one portion of the text.

12. A method according to claim 11, wherein if the pattern includes fewer characters than in the at least one portion of the text, one or more don't-care bit masks are generated.

13. A method according to claim 1, wherein performing the bit-wise operations comprises performing an AND operation on the bit masks.

14. A method according to claim 13, wherein the AND operation is performed additionally on one or more bit words representative of the content of a previous portion of the text.

15. A method according to claim 14, wherein the one or more bit words comprise a feedback bit word indicative of appearance of prefixes of the pattern In the previous portion of the text.

16. A method according to claim 14, wherein the one or more bit words comprise a carry over bit word indicative of appearance of another pattern included in a single multi-pattern with the pattern for which the bit words are generated, in the previous portion of the text.

17. A method according to claim 1, wherein providing the indication of whether the pattern appears in the text comprises providing an indication on where the pattern appears in the text.

18. A method according to claim 1, wherein performing bit-wise operations comprises performing a set of independents which is independent of the pattern and text.

19. A method according to claim 1, comprising generating bit-masks, performing bit-wise operations and providing an indication for a plurality of patterns, substantially concurrently.

20. A search machine, comprising:
a text window adapted to receive a portion of a text;
at least one bit mask generator adapted to generate a plurality of bit masks each representing one or more characters, each bit mask indicating for each position in the text window whether the position carries one of the one or more characters represented by the bit mask; and
at least one pattern matching unit adapted to search for a respective pattern in the text, by manipulating bit masks, generated by the at least one bit mask generator, corresponding to the pattern.

21. A search machine according to claim 20, wherein the text window is adapted to receive consecutive segments of a length L of the text.

22. A search machine according to claim 20, wherein the at least one pattern matching unit comprises a plurality of pattern matching units.

23. A search machine according to claim 22, wherein the at least one bit mask generator comprises a single bit mask generator which provides bit masks to each of the plurality of pattern matching units.

24. A search machine according to claim 22, wherein the at least one bit mask generator comprises a plurality of bit mask generators which correspond to the plurality of pattern matching units.

25. A search machine according to claim 22, comprising at least one transfer line which passes results from one pattern matching unit to at least one other pattern matching unit.

26. A search machine according to claim 25, wherein the at least one transfer line comprises at least two transfer lines which pass results from one pattern matching unit to at least one other pattern matching unit.

27. A search machine according to claim 25, comprising a configurable controlled gate adapted to determine whether the transfer line passes results to the other pattern matching unit.

28. A search machine according to claim 22, wherein the plurality of pattern matching units are substantially identical.

29. A search machine according to claim 22, wherein at least one of the plurality of pattern matching units is different in structure from at least one other of the pattern matching units.

30. A search machine according to claim 22, wherein the plurality of pattern matching units comprise at least ten pattern matching units.

31. A search machine according to claim 22, wherein the plurality of pattern matching units represent patterns of at least two different lengths.

32. A search machine according to claim 22, wherein the at least one pattern matching unit comprises a shift unit adapted to shift at least one of the bit masks according to the position in the pattern represented by the bit mask.

33. A search machine according to claim 32, wherein the at least one pattern matching unit comprises an AND unit which performs an AND operation between bit masks corresponding to each of the positions of the pattern.

34. A search machine according to claim 20, wherein the mask generator generates an alphabet match array for each character in an alphabet of the searching machine, and wherein a bit mask in the alphabet match array has a first value in each position in which the character appears in the text window, while the remaining positions of the bit mask are a second value.

35. A search machine according to claim 34, wherein the first value is 1 and the second value is 0.

* * * * *

UNITED STATES PATENT AND TRADEMARK OFFICE
CERTIFICATE OF CORRECTION

PATENT NO. : 7,596,553 B2  Page 1 of 1
APPLICATION NO. : 10/269742
DATED : September 29, 2009
INVENTOR(S) : Meirovitz et al.

It is certified that error appears in the above-identified patent and that said Letters Patent is hereby corrected as shown below:

Title page should read:
Item (73) Assignee: ~~Avaya Inc., Basking Ridge, NJ~~ <u>Avaya Communication Israel Ltd., Tel Aviv, Israel</u>

Signed and Sealed this
Twenty-eighth Day of June, 2011

David J. Kappos
*Director of the United States Patent and Trademark Office*